United States Patent [19]

Hoover

[11] 3,924,159

[45] Dec. 2, 1975

[54] AMPLIFIER PROTECTION SYSTEM

[75] Inventor: Merle Vincent Hoover, Flemington, N.J.

[73] Assignee: RCA Corporation, New York, N.Y.

[22] Filed: Oct. 4, 1974

[21] Appl. No.: 512,225

[52] U.S. Cl. .......... 317/33 R; 317/33 SC; 317/16; 330/207 P; 328/146

[51] Int. Cl.[2] .......... H02H 3/08; H02H 7/20

[58] Field of Search ... 317/31, 33 R, 33 VR, 33 SC, 317/16; 330/207 P, 11 P, 30 D; 328/146, 135; 307/289

[56] References Cited

UNITED STATES PATENTS

| | | | |
|---|---|---|---|
| 3,493,878 | 2/1970 | Fautale | 330/11 |
| 3,536,958 | 10/1970 | Sondermeyer | 317/33 R |
| 3,555,358 | 1/1971 | Gibbs | 330/11 X |
| 3,564,338 | 2/1971 | Yokohama-shi et al. | 330/11 X |
| 3,579,042 | 5/1971 | Abend | 330/11 X |
| 3,681,659 | 8/1972 | Suzuki | 317/31 X |
| 3,760,230 | 9/1973 | Henderson | 317/33 R X |

FOREIGN PATENTS OR APPLICATIONS

| | | | |
|---|---|---|---|
| 1,923,036 | 12/1970 | Germany | 317/33 R |

*Primary Examiner*—J. D. Miller
*Assistant Examiner*—Patrick R. Salce
*Attorney, Agent, or Firm*—Harold Christoffersen; Samuel Cohen; Kenneth Watov

[57] ABSTRACT

An emulating amplifier stage, that can be lower in power capability but otherwise has the same electrical operating parameters as the amplifier output stage being protected, forms a bridge network with this output stage. A resistor is connected between two nodes of the bridge (between the output terminals of these stages). When a fault occurs, such as a short circuit across the load being driven by the amplifier, the bridge network becomes unbalanced and current flows through the resistor. In response thereto, the drive signal and bias voltage are removed from the input circuit of the output stage.

17 Claims, 1 Drawing Figure

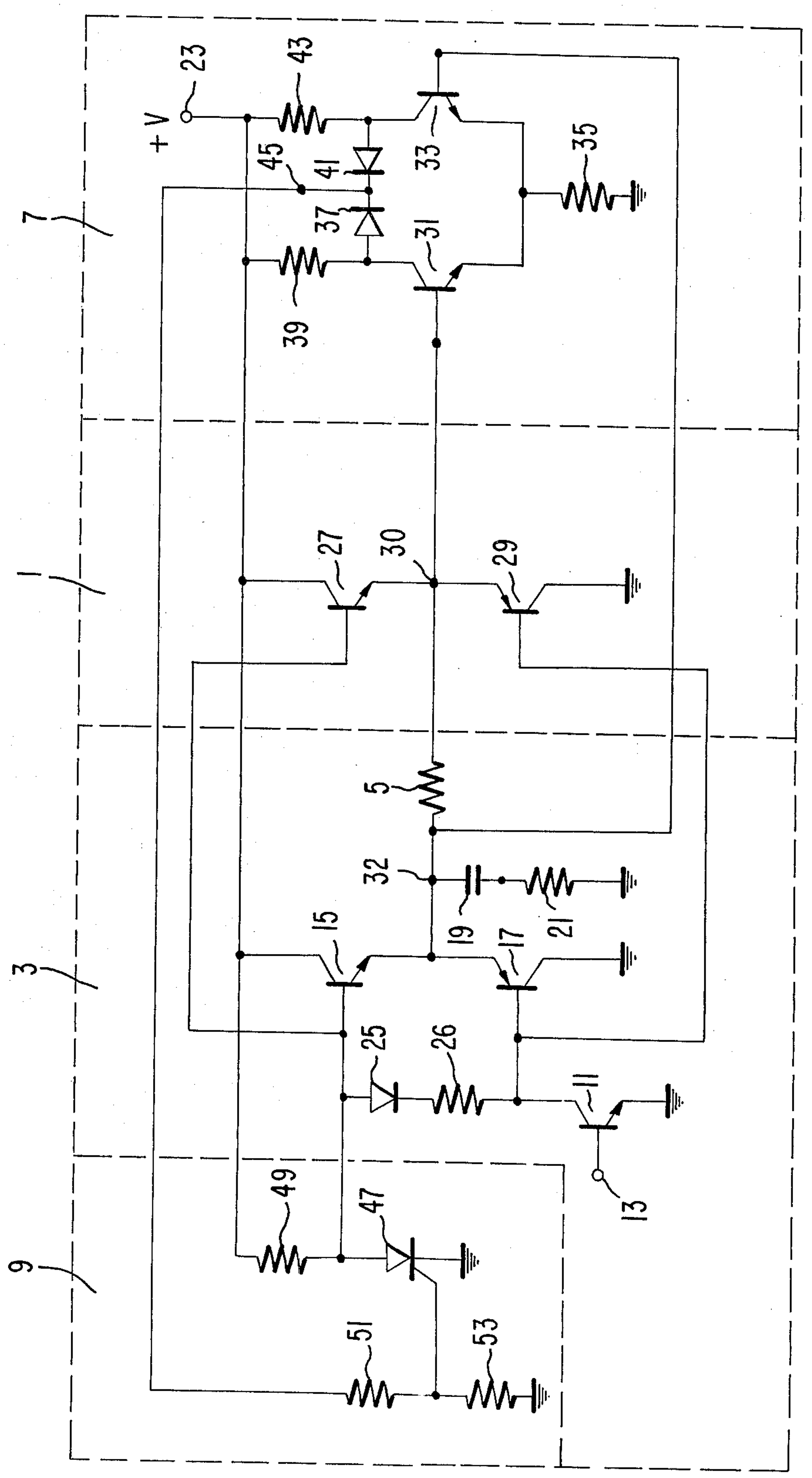
+ V
23
43
45
41
37
33
35
31
39
7
1
27
30
29
5
32
19
21
15
17
3
25
26
11
13
49
47
9
51
53

AMPLIFIER PROTECTION SYSTEM

Many prior art amplifier protection systems employ emitter current monitoring of the transistorized output stage. In such systems, when the current passing through a resistor in series with the emitter electrode of the output transistor exceeds a given value, the drive signal is removed from the output stage. Such resistors, although low in resistance values, dissipate power and, as a result, reduce the power capability of the output stage. Also, because the monitoring resistor is of low value, there is a problem of manufacturing tolerance, that is, of obtaining the same resistance value in a run of manufactured products. Finally, the parameters of the protective circuit may vary with temperature and age and this can cause the point at which protection is obtained to vary-sufficiently so in some cases that damage can occur before the protection circuit is activated.

The protective circuit of the present invention, unlike the prior art, is relatively independent of temperature. When implemented in integrated circuit form, it requires a relatively small substrate area and the required matching of electrical characteristics is easily obtainable.

The circuit includes a protection amplifier having substantially identical electrical operating parameters for an input signal, as the output stage of the first amplifier, and connected in parallel therewith. A current sensor is connected between the output terminals of the output stage and protection amplifier. A detecting circuit coupled to the sensor removes drive signals from the output stage, when the sensor senses a flow of current.

The single FIGURE is a schematic diagram of an output stage of a transistorized complementary-symmetry amplifier which embodies the invention.

The protective circuit shown in the drawing includes an emulating amplifier 1 substantially identical in design to the amplifier 3 being protected, a current sensing means shown as resistor 5, a current sensor or differential voltage detector shown as differential amplifier 7, and circuit means for removing bias voltages from the driver stage 11, and drive signals and bias voltages from the output stage of the amplifier 3 in response to an output signal from the differential amplifier 7, the circuit means being shown as a crowbar circuit 9.

For the purpose of illustrating the operation and circuitry of the protective circuit, a transistorized complementary-symmetry amplifier 3 is shown, but other types of amplifiers can be protected in the manner of the present invention.

The complementary-symmetry amplifier 3 includes an NPN input or driver transistor 11 connected at its emitter electrode to a point at a reference voltage, ground in this illustration, and coupled at its collector electrode to the base electrodes of the complementary transistors 15, 17 of the output stage. The complementary transistors 15, 17 are interconnected to form a complementary-symmetry output stage. A coupling capacitor 19 and load impedance 21 are connected in series between the emitters of the complementary transistors 15, 17 and ground. NPN transistor 15 is connected at its collector electrode to an operating voltage terminal 23; PNP transistor 17 is connected at its collector electrode to ground. Series connected diode 25 and resistor 26 are connected between the base electrodes of transistors 15, 17, the diode being connected at its anode to the base electrode of transistor 15.

The protective circuit includes the emulating amplifier 1, which is substantially identical in electrical operating characteristics to the complementary-symmetry output stage 15, 17 of the amplifier 3, but which can have substantially lower power handling capacity than this output stage. The latter implies lower cost and, in the integrated circuit art, smaller area; however, if these are not of importance in a particular design, the emulating amplifier can be of the same or even of greater power handling ability than the output stage.

The emulating amplifier 1 includes complementary transistors 27, 29, one being NPN transistor 27, the other being PNP transistor 29. The collector electrode of the NPN transistor 27 is connected to the collector electrode of the NPN transistor 15 of the amplifier 3, whereas the collector electrode of the PNP transistor 29, is connected to ground. The base electrodes of the NPN and PNP transistors 27, 29 of the emulating amplifier 1 are connected to the base electrodes of the NPN and PNP transistors 15, 17 respectively. A current sensing means, resistor 5, is connected between the joined emitter electrodes of transistors 15, 17 and the joined emitter electrodes of transistors 27, 29. The output stage 15, 17 of the amplifier 3 and the emulating amplifier 1 form a balanced bridge network with respect to direct current. The bridge network is substantially balanced in the audio frequency range and at frequencies beyond this range depending upon the particular circuit design.

The means for sensing current flow through resistor 5 is shown as a differential comparator 7; however, any one of a number of other devices which are capable of detecting a voltage differential across a circuit element may be used instead. The differential amplifier 7 includes a pair of NPN transistors 31, 33 connected at the emitter electrodes through a resistor 35, to ground. The sensing resistor 5 is connected at one terminal 30 to the base electrode of transistor 31, and at its other terminal 32 to the base electrode of transistor 33. The collector electrode of NPN transistor 31 is connected to the anode of a diode 37, and to one end of a resistor 39, the other end of the resistor 39 being connected to operating voltage terminal 23. The collector of NPN transistor 33 is connected to the anode of a diode 41 and to one end of resistor 43, the other end of the resistor 43 being connected to the operating voltage terminal 23. The cathodes of diodes 37 and 41 are commonly connected to the output terminal 45 of the differential amplifier 7.

The crowbar circuit 9 includes a silicon controlled rectifier (SCR) 47 having an anode electrode connected to the base electrode of NPN transistor 15. A resistor 49 is connected between the anode of SCR 47 and operating voltage terminal 23. The cathode of SCR 47 is connected to ground. A resistor 51 has one end connected to the output terminal 45 of differential amplifier 7, and a resistor 53 has one end connected to a reference voltage, in this case ground; the other ends of the resistors 51 and 53 are commonly connected to the control electrode of the SCR 47.

The complementary-symmetry amplifier 3 is of a design that is well-known in the art. Complementary transistors 15 and 17 are biased at their respective base electrodes by the series circuit formed by the resistors 49 and 26 and diode 25. Diode 25 also provides temperature compensation. Resistors 49 and 26 and diode 25 are also used to couple the collector electrode of the NPN commonemitter driver stage 11 to the operating voltage terminal 23.

In normal operation, an input signal is applied to input terminal 13. The transistor 11, operated by the input signal, supplies drive signals to the base electrodes of transistors 15 and 17. The amplified signal is applied through coupling capacitor 19 to a load impedance 21.

The emulating amplifier 1 of the protective circuit is designed to have substantially the same operating parameters as the complementary output stage 15, 17 of amplifier 3. In integrated circuit applications, the emulating amplifier 1 can readily be made substantially identical in design to the output stage of amplifier 3 being protected. Lower power transistors may be used in the emulating amplifier 1 to reduce the substrate area required, and to reduce costs.

In normal operation, the output signals from amplifier 3 and emulating amplifier 1 appearing at points 32 and 30, respectively, across sensing resistor 5, will be equal in magnitude. As a result, no current will flow through sensing resistor 5. During such normal operation, the output signal from differential amplifier 7 coupled to the control electrode of SCR 47 will be at or near ground potential. The SCR 47 will remain in its off-state so long as the differential amplifier 7 remains untoggled.

In the event that the operating voltage +V is connected to terminal 32, the output termination of amplifier 3, either through accident or a fault in transistor 15, excessive current will flow through PNP transistor 17. Also, because a substantial voltage difference now exists between terminals 32 and 30, current flows through the sensing resistor 5, and the differential amplifier 7 is triggered. Transistor 33 turns on and transistor 31 turns off. The voltage at the collector of transistor 33 now drops and that at the collector of transistor 31 increases toward +V, causing diode 37 to conduct and diode 41 to cutoff. This makes output terminal 45 positive, and this positive voltage applied via resistor 49 to the anode of the SCR 47 drives the latter into conduction. This conducting SCR 47 is a low impedance path between the base of transistor 15 and ground. When the base of transistor 15 is at ground, no operating voltage is available for the collector of input transistor 11, so it goes off. Therefore, no drive signal is available for the amplifier transistors 15 and 17, the input circuit to these transistors having been effectively disabled. As this input circuit is common to the emulating amplifier 1, the latter also is protected.

In a similar manner, if the operating voltage is connected to point 30, either through accident or a fault in transistor 27 of emulating amplifier 1, terminal 30 will become higher in potential than point 32. Transistor 29 will tend toward excess power dissipation, current will flow from terminal 30 through sensing resistor 5 to terminal 32, and from terminal 32, through transistor 17 to ground. The differential amlifier 7 will detect the voltage differential across sensing resistor 5, whereby transistor 31 will be toggled into saturation, and transistor 33 will be toggled into cutoff. The operating voltage will now be coupled by means of resistor 43 and diode 41 to the output terminal 45 of differential amplifier 7. The crowbar circuit 9 will now be operated in the manner described above to disable amplifier 3, thereby protecting the output stage of the amplifier 3 and the emulator 1 from damage.

In the event of a ground fault at terminal 32 as, for example occurs when a short circuit is placed across the load 21 and capacitor 19, the bridge again becomes unbalanced. Excess current flows through transistor 15 which, if allowed to continue, would damage or destroy the amplifier 3. Current also flows through transistor 27 and resistor 5 to ground, and the voltage thereby developed across the resistor 5 toggles the differential amplifier 7 in the manner already discussed. The output signal from the differential amplifier 7 goes positive, triggering SCR 47 into conduction and disabling the amplifier 3 and emulator 1 input circuit.

In the event of a ground fault at point 30, transistor 27 will tend to draw excess current, due to the decrease in its load impedance. Also, the output stage of amplifier 3 will be presented with a reduced load impedance, causing transistor 15 to drive current through sensing resistor 5 to point 30, whereby the potential at point 32 will be greater than the potential at point 30. The differential amplifier will toggle in the manner described above for a voltage fault at point 32, operating crowbar circuit 9 to disable amplifier 3 and emulating amplifier 1.

The present invention, as described above, while described in terms of bipolar transistors is applicable for use in protecting the output stage of amplifiers comprising CMOS transistors, for example, and other amplifiers.

What is claimed is:

1. A protection circuit for protecting the output stage of an amplifier from damage when a ground or voltage fault is connected to an output terminal of said output stage, said output stage having at least one input terminal receptive of a drive signal and bias voltages, the output terminal of said output stage being coupled to a load impedance, said protection circuit including:

an emulating output stage having substantially the same operating characteristics as and connected in parallel with said output stage of said amplifier, said emulating output stage having an output terminal;

current sensing means connected between said output terminal of said emulating output stage and said output terminal of said output stage of said amplifier, respectively, whereupon a zero voltage differential exists across and no current flows through said sensing resistor during normal operation of said amplifier, whereas when a ground or voltage fault occurs at the output terminal of said amplifier, current will flow through and cause a voltage differential to exist across said sensing means;

means coupled across said current sensing means for producing a signal manifestation indicative of a voltage differential existing across said current sensing means; and means responsive to said signal manifestation for removing the drive signal from said output stage of said amplifier.

2. The protection circuit of claim 1, wherein said signal manifestation producing means includes a differential amplifier having a pair of input terminals connected across said current sensing means, and an output terminal coupled to a control electrode of said means responsive to said signal manifestation, whereupon said differential amplifier is responsive to the occurrence of a voltage differential across said current sensing means to produce said signal manifestation at the output terminal of said differential amplifier.

3. The protection circuit of claim 1, wherein said means responsive to said signal manifestation includes a crowbar circuit having a control electrode receptive of said signal manifestation, a first main current carrying electrode coupled to at least one of said input terminals of said output stage of said amplifier, and a second main current carrying electrode connected to a reference voltage, whereupon said crowbar circuit is operated by said signal manifestation to shunt said drive signal and bias voltages to said reference voltage in the event of a fault at said output terminal of either said output stage of said amplifier or said emulating output stage.

4. The protection circuit of claim 1, wherein said emulating output stage is of lower power capability than the output stage of said amplifier.

5. A circuit for protecting an output stage of a first amplifier, said output stage having an output terminal, and at least one input terminal receptive of a drive signal, said output terminal of said output stage being connected to a load impedance, said protection circuit comprising:

a second amplifier substantially identical to the output stage of said first amplifier connected in parallel with said output stage, said second amplifier having an output terminal;

a current sensor connected between said output terminals of said output stage of said first amplifier and said second amplifier, whereupon a zero voltage differential exists across and no current flows through said current sensors during normal operation of said first amplifier, whereas upon the occurrence of a ground or voltage fault at the output terminal of said first amplifier, current will flow through and cause a voltage differential to exist across said current sensor;

means coupled across said current sensor for producing a signal manifestation indicative of a voltage differential existing across said current sensor; and means responsive to said signal manifestation for removing the drive signal and bias voltages from said output stage of said first amplifier whenever said signal manifestation is indicative of a fault in said first amplifier.

6. The protection circuit of claim 5, wherein said signal manifestation means includes a differential amplifier having a pair of input terminals connected across said current sensor, and an output terminal coupled to a control electrode of said means responsive to said signal manifestation, whereupon said differential amplifier is responsive to a voltage differential across said current sensor to produce said signal manifestation at the output terminal of said differential amplifier.

7. The protection circuit of claim 5, wherein said means responsive to said signal manifestation includes a crowbar circuit having a control electrode receptive of said signal manifestation, a first main current carrying electrode coupled to at least one of said input terminals of said output stage of said first amplifier, and a second main current carrying electrode connected to a reference voltage, whereupon said crowbar circuit is operated by said signal manifestation to shunt said drive signal to said reference voltage in the event of a fault at said output terminal of said output stage of said amplifier.

8. The protection circuit of claim 5, wherein said second amplifier is of lower power capability than the output stage of said first amplifier.

9. A circuit for protecting the output stage of an amplifier from an overload condition, the output stage comprising an output amplifier having an input terminal means to which an input signal may be applied, and an output terminal, and a load coupled between said output terminal and a point of reference voltage comprising:

a second amplifier having substantially the same electrical operating characteristics for the input signal, as said output amplifier, said second amplifier having an output terminal, an input terminal means connected to the input terminal means of said output amplifier and receptive of the same signal, and in other respects also connected in parallel with said output amplifier;

current sensing means connected between the output terminals of said two amplifiers, and means responsive to said current sensing means for effectively placing a low impedance path between said input terminal means of said output amplifier and a point of reference voltage.

10. The circuit of claim 9, wherein said current sensing means comprises a resistor.

11. The circuit of claim 10, wherein said means responsive to said current sensing means comprises means connected across said current sensing means for sensing the voltage produced across said resistor.

12. A circuit as set forth in claim 9, wherein said output stage and second amplifier comprises complementary-symmetry amplifiers, each amplifier comprising two transistors of different conductivity types, each transistor having a conduction path, the two conduction paths connected in series between operating voltage terminals, and each amplifier output terminal being at the connection of the two conduction paths.

13. A circuit as set forth in claim 9, wherein said load is capacitively coupled between said output terminal of said output stage and said point of reference potential.

14. A circuit for protecting the output stage of an amplifier from an overload condition comprising, in combination:

a protective amplifier stage having substantially the same operating characteristics for an identical input signal as said output stage forming a bridge with said output stage and connected to receive the same input signals as said output stage, said bridge having two nodes at opposite points of the bridge which, in normal operation, in view of the balanced condition of the bridge, operate at the same voltage levels;

current sensing means connected to said nodes for sensing an imbalance in the bridge, and means responsive to said current sensing means for effectively removing said input signals from said output stage when said bridge becomes imbalanced.

15. A circuit as set forth in claim 14, further including a load capacitively coupled between one of said nodes and a point of reference potential.

16. A circuit as set forth in claim 15, wherein said output stage and said protective stage comprise CMOS amplifiers, each amplifier comprising a P type MOS transistor, the conduction path of which is connected in series with the conduction path of an N type MOS transistor, between two operating voltage terminals, the nodes of the bridge being located at the connections between conduction paths of the P and N transistors.

17. A circuit as set forth in claim 16, further including a load capacitively coupled between one of said nodes and one of said operating voltage terminals.

* * * * *